United States Patent [19]

Lafferty

[11] Patent Number: 5,027,051

[45] Date of Patent: Jun. 25, 1991

[54] PHOTOVOLTAIC SOURCE SWITCHING REGULATOR WITH MAXIMUM POWER TRANSFER EFFICIENCY WITHOUT VOLTAGE CHANGE

[76] Inventor: Donald Lafferty, 724 Tampico, Walnut Creek, Calif. 94598

[21] Appl. No.: 482,279

[22] Filed: Feb. 20, 1990

[51] Int. Cl.$^5$ ............................................. G05F 1/613
[52] U.S. Cl. .................................... 323/222; 323/299; 323/906
[58] Field of Search ................. 323/222, 223, 299, 906

[56] References Cited

U.S. PATENT DOCUMENTS

| | | | |
|---|---|---|---|
| 3,384,806 | 5/1968 | Hartman | 323/906 |
| 3,696,286 | 10/1972 | Ule | 323/222 |
| 4,346,431 | 8/1982 | Steigerwald | 323/222 |
| 4,468,569 | 8/1984 | Norris | 323/299 |
| 4,530,043 | 7/1985 | Palm et al. | 323/222 |
| 4,556,838 | 12/1985 | Brasseur | 323/299 |
| 4,580,090 | 4/1986 | Bailey et al. | 323/406 |
| 4,661,758 | 4/1987 | Whittaker | 323/906 |
| 4,695,785 | 9/1987 | Mieth | 323/906 |
| 4,728,878 | 3/1988 | Anthony | 323/906 |
| 4,742,291 | 5/1988 | Bobier | 323/906 |
| 4,816,739 | 3/1989 | Sakurai et al. | 323/222 |
| 4,873,480 | 10/1989 | Lafferty | 323/906 |

Primary Examiner—Steven L. Stephan
Assistant Examiner—Jeffrey Sterrett

[57] ABSTRACT

For matching the electrical impedance of a photovoltaic power source and a load, a switching regulator circuit has properties especially suited to the conversion of photovoltaic power to electric power. The circuit regulates the source voltage for maximum power output and supplies a load voltage equal to the regulated source voltage. The circuit comprises two branches: one in which a switching transistor (38), a diode (40), and filter components (30) and (42) provide a positive voltage; and the other in which similar components (22, 32, 24, and 44) in a different configuration, provide a negative voltage. The load voltage is the sum of these and is equal to the input voltage. Since the source voltage is substantially constant, the switching regulator in effect converts the photovoltaic power source to a constant-voltage source. The circuit provides improved performance and thus enhances the utility of photovoltaic power sources.

20 Claims, 2 Drawing Sheets

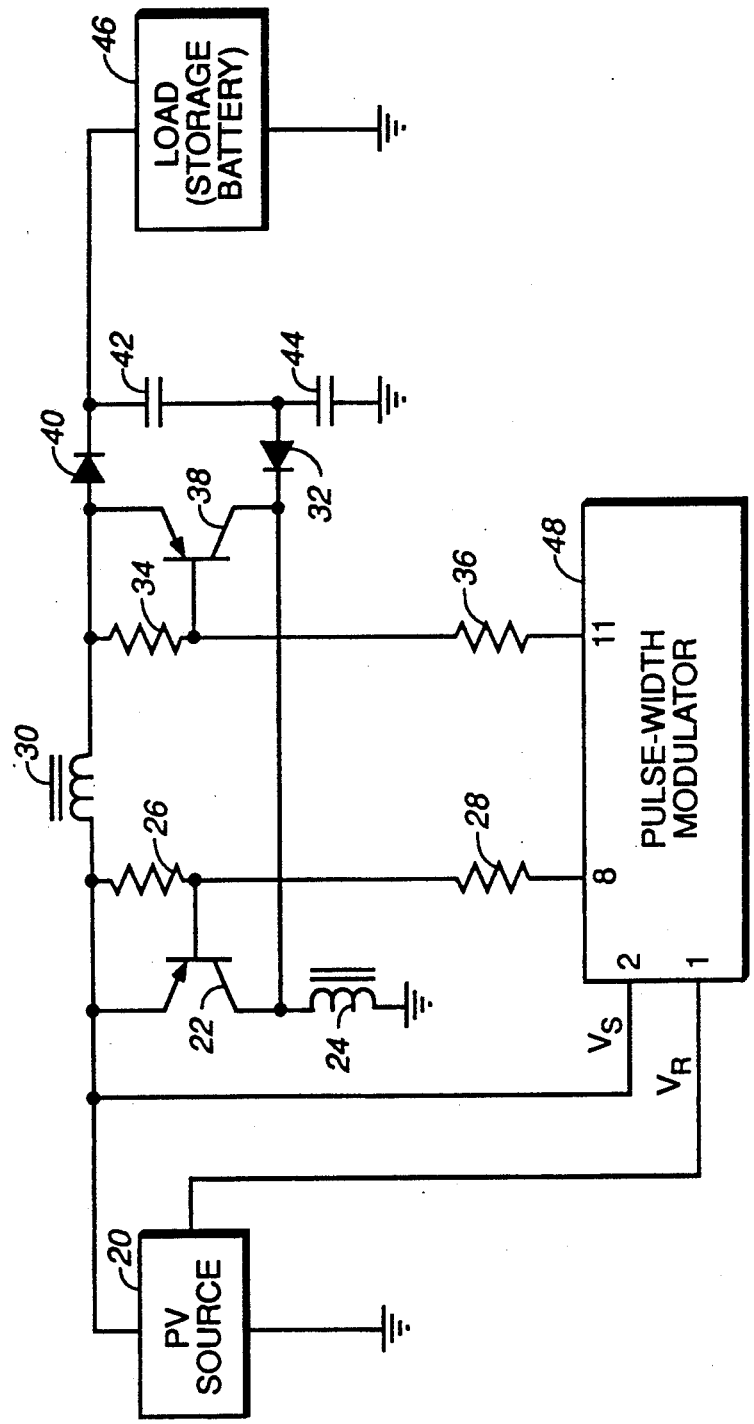
FIG._1

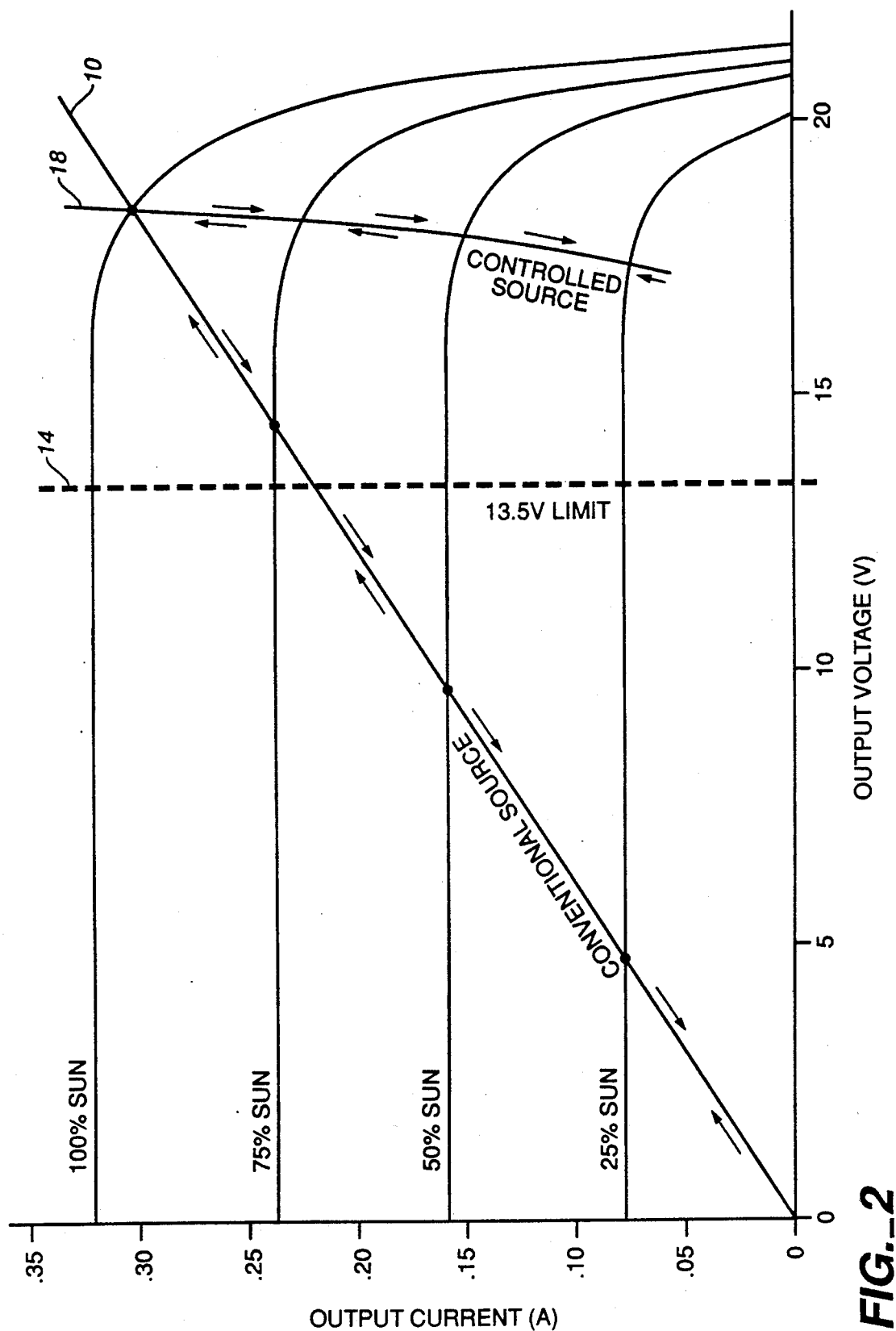
FIG._2

PHOTOVOLTAIC SOURCE SWITCHING REGULATOR WITH MAXIMUM POWER TRANSFER EFFICIENCY WITHOUT VOLTAGE CHANGE

BACKGROUND

1. Field of Invention

This invention relates to a system for converting solar energy to electrical energy by an array of photovoltaic cells, specifically to a circuit for improving the conversion efficiency of such a system.

A number of systems have been developed to couple an electrical power source to a load; some of these are shown in the following U.S. patents: Hartman (U.S. Pat. No. 3,384,806, 1968), Ulle (U.S. Pat. No. 3,696,286, 1972), Steirgerwald (U.S. Pat. No. 4,346,431, 1982), Norris (U.S. Pat. No. 4,468,569, 1984), Palm et al. (U.S. Pat. No. 4,530,043, 1985), Brasseur (U.S. Pat. No. 4,556,838, 1985), Bailey et al. (U.S. Pat. No. 4,580,090, 1986), Whittaker (U.S. Pat. No. 4,661,758, 1987), Mieth et al. (U.S. Pat. No. 4,695,785, 1987), Sakurai et al. (U.S. Pat. No. 4,816,739, 1989), and may own patent (Lafferty, U.S. Pat. No. 4,873,480, 1989).

The systems of Anthony, Palm, Whittaker, Bobier, and Sakurai are not directly concerned with the efficiency of power transfer to a load. While the coupling networks of Hartman, Ulle, Norris, Brasseur., Bailey, Mieth, and Lafferty employ some form of switching regulator to ensure efficient power transfer from source to load, only hartman, Ulle, Norris, Bailey, Mieth, and Lafferty teach systems for improving the efficiency of the conversion of power from photovoltaic (PV) sources to a load. The Lafferty system has the further advantage of providing temperature compensation.

In these systems, the current flow from the source is controlled by a regulator to keep the load impedance adjusted to equal the source impedance. Under this condition, maximum power transfer is obtained. However, the output voltage is not regulated, i.e., it varies as a function of the input voltage and the load current. Thus, many of these converters do not supply a usable output voltage because most applications of PV sources need a regulated output voltage. Also, the efficiency of the conversion process suffers when output voltage variations exceed usable limits.

In other words, none of the prior-art converters uses a regulator circuit that is capable of maintaining a fixed output voltage while delivering maximum available power to the load. In each case, the output voltage is a function of the load current, as well as the input voltage. Simply put, the unregulated output voltage sharply limits the utility and efficiency of PV sources.

OBJECTS AND ADVANTAGES

It is, therefore, a primary object of the present invention to provide an improved photovoltaic conversion system. Other objects are to provide such a system with an improved coupling network connecting the PV cells to their load, and to provide such a network where the conversion efficiency of PV sources is improved by using a regulator whose output voltage equals the input voltage at all times.

Since the regulator provides maximum power output at constant voltage, the present invention offers several advantages over the aforedescribed prior art.

In particular, the ability of my regulator to provide maximum available power at constant voltage increases the conversion efficiency of PV sources.

Also, my invention expands the utility range of PV sources; simplifies design technology; improves power-to-weight ratios of PV systems; and employs a simple, efficient circuit.

Further objects and advantages will become apparent as the description proceeds.

DRAWING FIGURES

FIG. 1 shows a functional block diagram of a solar energy system which incorporates a variable impedance-matching converter in accordance with my invention.

FIG. 2 shows current-voltage characteristic curves of a photovoltaic power module.

DRAWING REFERENCE NUMERALS 10 system load line for conventional source
14 13.5 V limit line
18 load line for controlled source
20 PV power source
22 PNP switching transistor D43C5
24 800 µH inductor
26 100 Ω resistor
28 500 Ω resistor
30 800 µ inductor
32 Schottky bypass diode
34 100 Ω resistor
36 500 Ω resistor
38 PNP switching transistor D43C5
40 Schottky bypass diode
42 10 µF capacitor
44 10 µF capacitor
46 load resistance
48 IC control chip Tl594

DESCRIPTION OF THE SWITCHING REGULATOR SYSTEM

FIG. 1 shows a block diagram of an electrical system which couples a VP (PhotoVoltaic module (group of PV cells) 20 to a load (storage batteries, capacitor, etc) 46. In accordance with the invention I provide a network for coupling module 20 to load 46. The effective impedance of this coupling network, which comprises all the other components in FIG. 1 (component values indicated above), varies with solar intensity and temperature so as to ensure optimal energy transfer between load 46 and source 20, without change of voltage.

Specifically, the coupling network comprises a high-frequency switching transistor 22 show emitter is connected to the top or positive (+) output terminal of module 20; the other (bottom) terminal of module 20 is grounded. The collector of transistor 22 is connected to the cathode of diode 32, to the collector of switching transistor 38, and to one terminal of inductor 24, which stores magnetic energy; the other terminal of inductor 24 is grounded. Resistor 26 is connected between the positive terminal of module 20 and the base of transistor 22.

One output (pin 8) of a pulse-width modulation chip (integrated circuit) 48 is connected to the base of transistor 22 by a resistor 28. Input pin 2 of chip 48 is connected to the positive terminal of module 20 to monitor the output voltage of the PV source. Input pin 1 of chip 48 is connected internally to a reference PV cell located within module 20. The open-circuit voltage of this reference cell specifies the proper value of the PV source voltage for maximum power output. The input signals at pins 1 and 2 of chip 48 are compared to produce an error signal which controls the on-time of the switching transistors. Output pins 8 and 11 of chip 48 provide these pulse-width modulated signals to transistors 22 and 38, respectively.

One terminal of inductor 30 is connected to the positive terminal of module 20 and the other joins one end of resistor 34, the emitter of switching transistor 38, and the anode of switching diode 40. The other end of resistor 34 joins the base of transistor 38 and one end of resistor 36, whose other end is connected to the second output (pin 11) of chip 48. The cathode of switching diode 32 is tied to the collector of transistor 38, and the anode of diode 32 is connected to one terminal of energy-storage capacitor 42 and one terminal of energy-storage capacitor 44. The other terminal of capacitor 44 is grounded. The second terminal of capacitor 42 is connected to the cathode of diode 40 and to the positive terminal of the load 46; the other terminal of load 46 is grounded.

OPERATING CURVES OF SWITCHING REGULATOR —FIG. 2

The operation of the switching regulator of FIG. 1 can best be described with the aid of FIG. 2.

FIG. 2 shows several I-V (current-voltage) characteristics of a PV module designed to maintain a 12 V battery in a state of charge. The plot summarizes the operation of the PV system in graphical form. The nested set of roughly rectangular curves displays the system response to four different light intensities at a temperature of 25° C. The top characteristic is the voltage-current path for maximum intensity of light at the surface of the earth (1 kW/m$^2$) and is denoted as 100% Sun (also known as air mass 1). The response to decreasing levels of sunlight is represented by the 75, 50 and 25% Sun curves.

A diagonal line 10 extending from the origin upward across the characteristic curves is the system load line for a conventional PV source. A conventional source is one which is connected to the load with no intervening impedance-matching network. The intersection of the load line and a particular characteristic is the operating point, which specifies the values of output voltage and current of the conventional PV source for this particular intensity of sunlight.

The operating point is constrained to move along the load line as the light intensity varies. As the sun comes up, the operating point moves from the origin up along the load line, indicating increasing values of voltage and current as sunlight increases. The maximum sunlight is reached at noon on bright, sunny days. As the sun goes down, the operating point moves back toward the origin. The arrows along the load line indicate this transit.

The position of the operating point also specifies the module's output power, which changes as the operating point moves. The maximum power for each of the four light intensities is indicated by the circled point on the knee of each characteristic. The locus of these maxima is a substantially vertical line 18.

The use of the impedance-matching network of FIG. 1 alters the behavior of the PV system as depicted on the I-V plot. With the network connected, the operating point is constrained to move along the locus of maximum power points (line 18). This result is due to the requirement that the load impedance match the source impedance for maximum power transfer from source to load. The operating point moves up and down this line as light intensity changes.

A checkered vertical line 14 to the right of center on the I-V plot is a constant-voltage line representing the lower boundary of the charging region at 13.5 V. The operating point must lie above this line when the 12 V battery is being charged.

The conventional PV source cuts in and out at 13.5 V, which means a battery can be charged between about 1000 hours and 1400 hrs on a good day. On the other hand, the operating point for the system with impedance matching lies above the limit line the entire day. The impedance-matched system delivers maximum power during this period.

However, the voltage indicated by an operating point on line 18 is the source voltage, not the load voltage.

The voltage coordinate of the operating point is actually the input voltage to the switching regulator. The output voltage from the regulator will vary widely because the conduction time must vary widely to satisfy the maximum power condition as temperature and light intensity vary.

OPERATION OF SWITCHING REGULATOR—FIG. 1

The regulators used in switch-mode power supplies perform the basic switching and control functions necessary for a regulated output voltage. The basic regulator circuits are well known and widely used. In each case, the output voltage is a function of both the input voltage and the duty cycle of the power switch. The duty cycle varies only slightly in controlling the output.

These same regulator circuits are employed in prior-art PV conversion systems in a somewhat different manner. In PV systems, it is the source voltage that is regulated, thereby to provide maximum power output. This voltage is relatively constant during the daily solar cycle, but the source current varies as the light intensity. The duty cycle of the transistors therefore must cover a wide range, depending on the regulator circuit chosen. The load voltage will show the same wide variation. The PV source puts out maximum power, but its applications as a voltage source under these conditions are limited.

As stated, the problem of wide variations in load voltage is overcome by the regulator circuit of FIG. 1. My circuit regulates the source voltage for maximum power output and supplies a load voltage equal to the regulated source voltage. As the source voltage is constant, so is the load voltage.

Details of the PV system illustrated in FIG. 1 are essentially similar to those of the system described in my previous patent, supra, except for the switching regulator circuit.

The circuit operation can be described by noting that the two switching transistors conduct current on alternate pulses from control chip 48. Thus, the transistors switch on an doff out of phase, like a push-pull circuit. When transistor 22 turns on, current through inductor 24 builds up; when transistor 22 turns off, current continues to flow through capacitor 44 as diode 32 switches on. Transistor 22 and diode 32 never conduct current at the same time. In a similar manner, current through inductor 30 builds up when transistor 38 turns on and continues to flow through diode 40 and capacitor 42 when transistor 38 turns off.

Each capacitor is charged to a voltage determined by the duty cycle of the current pulses. However, the capacitor voltages are different in magnitude and opposite in polarity. The sum of the two, one positive an done negative, is the voltage which appears across load 46. Each capacitor voltage increases with duty cycle in a manner such that the algebraic sum of the two always equals the source voltage.

The voltages are given by the following expressions:

$$V_{42} = V_s/(1-D) \text{ and } V_{44} = -DV_s/(1-D)$$

where $V_{42}$ and $V_{44}$ are the voltages across capacitor 42 and capacitor 44 respectively. D is the duty cycle, or the fraction of each cycle the transistors are on, and $V_s$ is the source voltage.

The load voltage $V_L$ then is equal to:

$$V_L = V_{42} + V_{44} = V_s/(1-D) - DV_s/(1-D)$$

of $$V_L = V_s$$

The load voltage is thus equal to the source voltage independent of the duty cycle of the switching transistors.

The input resistance of the upper branch controlled by transistor 38 is $R_L(1-D)^2$, and that of the lower branch is $R_L(1-D)^2/D^2$. Since the two resistances are effectively in parallel, the input resistance of the circuit is $$R_{IN} = R_L(1-D)^2/(1+D^2)$$

$R_{IN}$ is the input resistance to the switching regulator and $R_L$ is the resistance of load 46. The input resistance is seen to be a function of the load resistance and the duty cycle of the switching circuit, either or both of which may vary.

Important properties of the switching regulator circuit may be illustrated by several specific examples of circuit behavior. Suppose the PV system is supplying power from a module with a source voltage of 15 V at a duty cycle of 45%. Then $$V_{42} = 15V/(1-0.45) = 27.27V$$

and $$B_{44} = -(0.45)(15\ V)/(1-0.45) = -12.27\ V$$

so that the load voltage is $$V_L = V_{42} + V_{44} = 27.27V - 12.27V = 15V$$

If the duty cycle is increased to 60% by the feedback loop to maintain maximum power output from the module as the light intensity increases, the voltages are readjusted to values of $$V_{42} = 37.5V \text{ and } V_{44} = -22.5V$$

which maintains a load voltage of $$V_L = 37.5V - 22.5V = 15V$$

If the resistance of load 46 has a nominal value of 1 kΩ, the input resistance to the regulator circuit is $$R_{IN} = 247\Omega$$

at 45% duty cycle, and $$R_{IN} = 118\Omega$$

at a duty cycle of 60%.

It is seen from these examples that the input resistance to the regulator circuit varies with the duty cycle to keep the source and load impedance matched, while the output voltage of the regulator remains constant. These properties of the circuit are reiterated below for emphasis.

(1) The PV source voltage is regulated for maximum power output, $$V_s = V^*$$

where $V^*$ is the voltage coordinate of the maximum power point on the appropriate I-V characteristic.

(2) The output voltage from the regulator is equal to its input voltage (independent of duty cycle), $$V_L = V_s = V^*$$

(3) The input resistance of the regulator is a function of the duty cycle of the switching transistors, as required for control purposes, $$R_{IN} = R_L(1-D)^2/(1+D^2)$$

The principal impact of my switching regulator is now apparent; the output voltage from the regulator will be determined by the operating point on the locus line 18 of FIG. 2. The PV source will resemble an ideal voltage source for practical purposes; it will deliver the available current at a fixed voltage.

CONCLUSIONS, RAMIFICATIONS, AND SCOPE OF INVENTION

The reader will see that I have provided a switching regulator circuit with properties especially suited to the conversion of photovoltaic power to electric power. This circuit converts the PV source from a power source to a voltage source. There are many advantages to this conversion. Maximum power is extracted from the source in the most desirable form; constant voltage and variable current. The versatility and improved efficiency will greatly expand the utility of the PV source.

While a simple version of the circuit has been presented here, a number of enhancements and variations can be provided.

The components comprising the regulator of FIG. 1 can be arranged to produce another version of my circuit with properties similar to the circuit illustrated. The following exchange of components will achieve this result: 22 → 30; 24 → 38; 30 → 22; 32 → 40; 38 → 24; 40 → 32; 42 → 44; and 44 → 42.

Further, the switching transistors can be NPN or PNP bipolar, field effect devices, or any such power device capable of high-frequency switching with a controllable duty cycle.

Accordingly, the scope of the invention should be determined not by the embodiment illustrated, but by the appended claims and their legal equivalents.

I claim:

1. A switching circuit for regulating a photovoltaic power source for maximum power transfer to a load without change in voltage, comprising:

first switching means having an input for connection to one output terminal of a photovoltaic power source, said first switching means having an output, first magnetic energy storage means having an input connected to said output of said first switching means and an output for connection to another output terminal of said photovoltaic power source which is opposite in polarity to said one terminal, second magnetic energy storage means having an input for connection to said one output terminal of said photovoltaic power source, said second magnetic energy storage means having an output, second switching means having an input connected to said output of said second magnetic energy storage means, said second switching means having an output, third switching means having an output connected to said output of said first switching means and to said output of said second switching means, said third switching means having an input, fourth switching means having an input connected to said output of said second magnetic energy storage means and an output connected to one terminal of said load, said load having another terminal opposite in polarity to said one terminal, first electric energy storage means having an output connected to said input of said third switching means, and an input connected to said one terminal of said load, second electric storage means having an output connected to said output of said first electric energy storage means and an input connected to said other terminal of said load and to said output of said first magnetic storage means, control means, responsive to an error signal, for causing said first switching means and said second switching means to alternately assume conductive and nonconductive states by alternately closing and opening the respective electric power flow paths between said input and said output of said first switching means and between said input and said output of said second switching means, the relative on an doff times of said first and second switching means being in opposite phase and having a duty cycle determined by said error signal, and error signal supply means for supplying said error signal to said control means.

2. The switching circuit of claim 1 wherein said first switching means is a first transistor.

3. The switching circuit of claim 1 wherein said first magnetic energy storage means is a first inductor.

4. The switching circuit of claim 1 wherein said second magnetic energy storage means is a second inductor.

5. The switching circuit of claim 1 wherein said second switching means is a second transistor.

6. The switching circuit of claim 1 wherein said third switching means is a first diode.

7. The switching circuit of claim 1 wherein said fourth switching means is a second diode.

8. The switching circuit of claim 1 wherein said first electric energy storage means is a first capacitor.

9. The switching circuit of claim 1 wherein said second electric energy storage means is a second capacitor.

10. The switching circuit of claim 1 wherein said control means is a pulse-width modulator.

11. The switching circuit of claim 1 wherein said error signal supply means comprises means for deriving a reference voltage from said source.

12. The switching circuit of claim 11 wherein said first switching means is a first transistor.

13. The switching circuit of claim 1 wherein said first magnetic energy storage means is a first inductor.

14. The switching circuit of claim 11 wherein said second magnetic energy storage means is a second inductor.

15. The switching circuit of claim 11 wherein said second switching means is a second transistor.

16. The switching circuit of claim 11 wherein said third switching means is a first diode.

17. The switching circuit of claim 11 wherein said fourth switching means is a second diode.

18. The switching circuit of claim 11 wherein said first electric energy storage means is a first capacitor.

19. The switching circuit of claim 11 wherein said second electric energy storage means is a second capacitor.

20. The switching circuit of claim 11 wherein said control means is a pulse-width modulator.

* * * * *